Patented Dec. 19, 1944

2,365,292

UNITED STATES PATENT OFFICE 2,365,292

SATURATED AND UNSATURATED 17-OXY-17-ACYL-ANDROSTANONES AND DERIVATIVES THEREOF AND PROCESS OF MAKING SAME

Leopold Ruzicka, Zurich, Switzerland, assignor, by mesne assignments, to Ciba Pharmaceutical Products, Incorporated, Summit, N. J., a corporation of New Jersey No Drawing. Application November 10, 1939, Serial No. 303,907. In Switzerland November 19, 1938

9 Claims. (Cl. 260—397.4)

It has been found that saturated or unsaturated 17-oxy-17-acyl-androstanones or derivatives thereof are obtained when saturated or unsaturated 17-oxy-pregnanolones or 17-oxy-pregnane-diols or homologues thereof are treated with oxidizing agents, if required with intermediate protection of the 17-hydroxyl group by means of a substituent capable of being converted into a hydroxyl group and further if desired with protection of existing double linkages; the compounds obtained being treated if desired with hydrolyzing agents, esterifying agents or both.

As parent substances may be named, for example, $\Delta^5$-pregnene-3:17-diol-20-one, $\Delta^1$-pregnene-3:17-diol-20-one, pregnane-3:17-diol-20-one, $\Delta^4$-pregnene-3-one-17:20-diol, $\Delta^5$-pregnene-3:17:20-triol, or homologues thereof such as $\Delta^5$-21-methyl-pregnene-3:17-diol-20-one. The 17-hydroxyl group may be intermediately protected for example by an ester group. Such compounds partially esterified in the 17 position, may be obtained for example by partial saponification of the corresponding polyester. In such circumstances the ester groups may be the same or different. It is especially advantageous to start from compounds containing in 17 position an ester group which is relatively difficult to saponify. The partial saponification is carried out in a manner in itself known, for example by hydrolysis or alcoholysis in weak alkaline or weak acid solution. As oxidizing agents there are used those known to the expert as suitable for conversion of an alcohol group into a keto group (compare J. Houben-Weyl, Die Methoden der organischen Chemie, 3d. edition, vol. 2, page 47 ff.) There come into question chromic acid in glacial acetic acid, metals and metal oxides, such as copper powder, cupric oxide and the like. There has also been proved advantageous the treatment with carbonyl compounds in the presence of catalysts, for instance metal alcoholates or metal acylates. If desired a biochemical oxidation may also be used. Existing double linkages may be protected in known manner.

The process produces saturated or unsaturated 17 - oxy - 17 - acyl - androstanones or derivatives thereof, such as esters or enol esters. The esters obtained may be saponified in known manner by the help of hydrolyzing agents. The free 17-oxy-compounds may be converted into any desired esterified derivatives, for instance into any esters or enol esters, in the latter case the ester groups being the same or different.

The new compounds are of use in therapeutics or serve as intermediates in the manufacture of products of therapeutic value.

*Example 1*

0.5 part of $\Delta^5$-pregnene-3:17-diol-20-one-17-monoacetate (prepared, for example, from $\Delta^{5:17}$-3-acetoxy-pregnadiene by treatment with osmium tetroxide, acylation, partial saponification, tritylation, alkaline saponification, oxidation, and acid hydrolysis) is dissolved in 15 parts of acetone and 30 parts of benzene and, after addition of 1 part of aluminium tertiary butylate, boiled under reflux for several hours. Water and dilute hydrochloric acid are then added, the reaction product is extracted with ether, the ether solution washed until neutral, dried, and evaporated. The residue contains the 17-oxy-progesterone acetate which may be separated chromatographically by use of aluminium oxide and then purified by recrystallization from methanol. For the purpose of saponification, 1 part of this acetate is dissolved in 50 parts of methanol and the solution is mixed with 5 parts of a solution of 10 per cent strength of potassium hydroxide in methanol and boiled under reflux for 3 hours. After working up, the 17-oxy-progesterone is recrystallized from methanol. As oxidizing agent, for example, chromium trioxide in glacial acetic acid may be used in place of acetone in the presence of aluminium tertiary butylate. In this case it is advantageous to provide for intermediate protection of the double linkage, for instance by bromination, with subsequent splitting off of the bromine, for example by means of zinc dust.

As parent material there may also be used $\Delta^5$-3-transacetoxy-17-benzoxy-pregnene-20-one.

If the free $\Delta^5$-pregnene-3:17-diol-20-one is used as the starting point, the 17-oxy-progesterone is also obtained.

In wholly similar manner there may be obtained the $\Delta^4$-21-methyl-17-oxy-pregnene-3:20-dione.

*Example 2*

3.3 parts of $\Delta^4$-pregnene-17:20-diol-3-one-17-acetate (prepared for example by reaction of 17-ethenyl-testosterone with perphthalic acid, hydrogenation of the oxide with a palladium-calcium carbonate catalyst, energetic acetylation, and partial saponification, or, also, from the known $\Delta^4$-pregnene-17:20-diol-3-one by energetic acetylation and partial saponification) are dissolved in 60 parts of chromic acid-resistant glacial acetic acid, a solution of 1 part of chromium trioxide dissolved in 15 parts of acetic acid of 90 per cent strength is added with cooling and the whole is allowed to stand 24 hours at room temperature. It is then poured into 500 parts of water, the reaction product extracted with ether and this solution is washed with dilute soda solution and water, dried and evaporated in a vacuum. The 17-oxy-progesterone acetate described in Example 1 may be obtained from the residue, and this may also be converted into the free 17-oxy-progesterone as is there described. By more or less energetic treatment with acylating agents, the latter may be converted into other types of esters, for example into the 17-acetate-3-enolacetate or into the 17-monopropionate.

*Example 3*

1 part of $\Delta^5$-pregnene-3:17:20-triol (prepared, for example, by dehydration of $\Delta^5$-3-acetoxy-pregnene-17-ol and treatment with osmium tetroxide as well as with sodium sulphite) is boiled with 25 parts of toluene, 8 parts of cyclohexanone and 1 part of aluminium iso-propylate for two hours under reflux. The reaction mixture is subjected to steam distillation for four hours and is then acidified and extracted with ether. The 17-oxy-progesterone may be obtained from the ether solution as described in the previous example.

When starting from 21-methyl-pregnane-3:17:20-triol (prepared for example from $\Delta^5$-17-allyl-androstene-3:17-diol by gentle acetylation, hydrogenation, dehydration, as well as treatment with osmium tetroxide and sodium sulphite), the 21-methyl-pregnane-17-ol-3:20-dione is obtained in an analogous manner. By energetic treatment with acylating agents, this may be converted into its 17-mono-esters, for example the acetate or propionate.

Instead of 21-methyl-pregnane-triol other homologous 17-oxy-pregnanolones or pregnandiols may be used as starting material.

What I claim is:

1. Process for the manufacture of unsaturated 17-hydroxy-17-acyl-androstanones and their derivatives, comprising causing oxidizing agents to act on a member of the group consisting of unsaturated pregnanolones and pregnandiols, which contain in the 17-position a member of the group consisting of a free and protected hydroxyl group, and the corresponding compounds substituted in the 21-position by an unsubstituted alkyl radical, unsaturation with respect to the carbon atom 3 being in the unsaturated 3-hydroxy compounds in the $\beta$-position and in the unsaturated 3-keto compounds in the $\alpha$-position.

2. Process for the manufacture of unsaturated 17-hydroxy-17-acyl-androstanones and their derivatives, comprising causing oxidizing agents to act on a member of the group consisting of unsaturated pregnanolones and pregnandiols, which contain in the 17-position a free hydroxyl group, and the corresponding compounds substituted in the 21-position by an unsubstituted alkyl radical, unsaturation with respect to the carbon atom 3 being in the unsaturated 3-hydroxy compounds in the $\beta$-position and in the unsaturated 3-keto compounds in the $\alpha$-position.

3. Process for the manufacture of unsaturated 17-hydroxy-17-acyl-androstanones and their derivatives, comprising causing oxidizing agents to act on a member of the group consisting of unsaturated pregnanolones and pregnandiols, which contain in the 17-position a free hydroxyl group, and the corresponding compounds substituted in the 21-position by an unsubstituted alkyl radical, unsaturation with respect to the carbon atom 3 being in the unsaturated 3-hydroxy compounds in the $\beta$-position and in the unsaturated 3-keto compounds in the $\alpha$-position, with intermediate protection of the 17-hydroxyl group.

4. Process for the manufacture of unsaturated 17-hydroxy-17-acyl-androstanones and their derivatives, comprising causing oxidizing agents to act on a member of the group consisting of unsaturated pregnanolones and pregnandiols, which contain in the 17-position a free hydroxyl group, and the corresponding compounds substituted in the 21-position by an unsubstituted alkyl radical, unsaturation with respect to the carbon atom 3 being in the unsaturated 3-hydroxy compounds in the $\beta$-position and in the unsaturated 3-keto compounds in the $\alpha$-position, with intermediate protection of the double linkages present.

5. Process for the manufacture of unsaturated 17-hydroxy-17-acyl androstanones and their derivatives, comprising causing oxidizing agents to act on a member of the group consisting of unsaturated pregnanolones and pregnandiols, which contain in the 17-position a free hydroxyl group, and the corresponding compounds substituted in the 21-position by an unsubstituted alkyl radical, unsaturation with respect to the carbon atom 3 being in the unsaturated 3-hydroxy compounds in the $\beta$-position and in the unsaturated 3-keto compounds in the $\alpha$-position, and treating the products thus obtained with acylating agents.

6. A $\Delta^4$-21-methyl-pregnene-3:20-dione substituted in the 17-position by a member of the group consisting of a free and an acylated hydroxyl group.

7. A $\Delta^4$-21-methyl-pregnene-3:20-dione substituted in the 17-position by a free hydroxyl group.

8. The 3-keto-17-hydroxy-androstanes which are unsaturated in the position 1 and which contain in the 17-position the grouping —COCH$_2$R, wherein R is a member of the group consisting of hydrogen and alkyl.

9. A member of the group consisting of the unsaturated 3-keto-pregnane-20-ones, which contain in the 17-position a member of the group consisting of a free and an acylated hydroxyl group, and the corresponding compounds substituted in the 21-position by an unsubstituted alkyl radical, unsaturation with respect to the carbon atom 3 being in the position 1.

LEOPOLD RUZICKA.